United States Patent [19]
Kotzin et al.

[11] Patent Number: 6,018,544
[45] Date of Patent: Jan. 25, 2000

[54] METHOD AND APPARATUS FOR SUBSCRIBER POWER LEVEL ADJUSTMENT IN A COMMUNICATION SYSTEM

[75] Inventors: Michael D. Kotzin, Buffalo Grove, Ill.; Reuven Meidan, Ramat Hasharon, Israel

[73] Assignee: Motorola, Inc., Schaumburg, Ill.

[21] Appl. No.: 08/734,143

[22] Filed: Oct. 21, 1996

Related U.S. Application Data

[63] Continuation of application No. 08/253,454, Jun. 3, 1994, abandoned.

[51] Int. Cl.[7] .................................................... H04B 1/69
[52] U.S. Cl. .......................... 375/206; 455/69; 455/522; 370/333
[58] Field of Search .................................. 375/200, 202, 375/203, 206, 208; 455/69, 422, 522; 370/318, 320, 332, 333, 335, 342

[56] References Cited

U.S. PATENT DOCUMENTS

| | | |
|---|---|---|
| 5,128,965 | 7/1992 | Henriksson .............................. 375/285 |
| 5,237,586 | 8/1993 | Bottomley . |
| 5,267,262 | 11/1993 | Wheatley, III .......................... 375/200 |
| 5,305,468 | 4/1994 | Bruckert et al. .......................... 455/69 |
| 5,345,598 | 9/1994 | Dent ...................................... 455/54.1 |
| 5,734,967 | 3/1998 | Kotzin et al. ............................. 455/63 |

*Primary Examiner*—Young T. Tse
*Attorney, Agent, or Firm*—Richard A. Sonnentag

[57] ABSTRACT

Subscriber power levels are adjusted to enhance interference cancellation in a DS-CDMA communication system. A base-station of the communication system receives signals from a plurality of subscribers and evaluates each signal. Based on the evaluation, particular subscribers are commanded to control their power levels such that different predetermined targets for the particular subscribers are maintained. The predetermined targets include, but are not limited to, received power, frame erasure rate, bit error rate and signal quality. The resulting power levels received at the base-station are substantially different, which is beneficially employed to enhance interference cancellation in the DS-CDMA communication system.

16 Claims, 3 Drawing Sheets

METHOD AND APPARATUS FOR SUBSCRIBER POWER LEVEL ADJUSTMENT IN A COMMUNICATION SYSTEM

This is a continuation of application ser. No. 08/253,454, filed Jun. 3, 1994 and now abandoned.

RELATED INVENTION

Reference is made to U.S. patent application Ser. No. No. 08/253,895, and now abandoned, "Method and Apparatus for Cancelling Interference in Signals Having Undergone Multipath" in behalf of Kotzin et al., filed on the same date herewith, containing related subject matter and assigned to the assignee of the present invention.

FIELD OF THE INVENTION

The present invention relates to subscriber power level adjustment, and more particularly to subscriber power level adjustment in communication systems.

BACKGROUND OF THE INVENTION

In a communication system such as a direct sequence spread-spectrum code division multiplex system (DS-CDMA), the uplink signal (the signal from a subscriber to a base-station) comprises a multiplicity of overlapping coded signals from individual subscribers. Each of these signals occupies the same radio frequency (RF) carrier bandwidth simultaneously and are distinguishable only by their specific encoding. The uplink signal is received at a base-station receiver as a composite received signal.

In conventional DS-CDMA systems, the base-station receiver decodes each subscriber separately by applying each respective subscribers' unique spreading code to the composite received signal. Each individual subscriber's signal is thereby "despread" from the composite received signal. Due to the nature of the family of codes utilized, the other subscriber's signals remain in a bandwidth-spread form until they are despread with their particular code. This allows the decoding of user data bits for a particular subscriber.

Traditional DS-CDMA systems endeavor to drive the uplink received signal strength received from different subscribers to the same level. This is done through the use of subscriber power control techniques. In IS-95, the subscribers are constantly given instructions from the base station on how to adjust their power level based on measurements made at the base. If the received subscriber power level falls below a predetermined target, the subscriber is told to increase its power. If the received subscriber signal raises above the target, the subscriber is told to decrease its power. This power control process is intended to optimize system capacity by keeping each subscriber's power at the minimum necessary to achieve a particular quality level. This is because, after despreading, a portion of received power from all other subscribers appears as additional noise (interference) to the despread signal of the desired subscriber. Optimum system performance is achieved when this interference is kept to the least amount possible.

An alternative technique adjusts the power level of subscriber units such that the decoded frame erasure rate (or alternative quality metric) for each subscriber unit, as measured by the base-station, is the same. However, in either technique, the natural and unavoidable variability in received signal strength can lead to capacity degradation. For example, a 3 dB difference between two subscribers can lead to a ⅓ loss of capacity since one of the subscribers will look like twice as much interference (as the other) to the system. The net effect is that the system receives the equivalent power of three subscribers when only two are present, resulting in the ⅓ loss of capacity.

Prior art techniques of interference cancellation are known which act to reduce the interference. This permits an increase in the sensitivity and or capacity of the multi-user system. The most common technique is to synthesize a replica of a particular subscriber's received signal, after it has been properly decoded, and utilize the synthesized replica to cancel interference (by subtraction) in a stored version of the received signal.

In systems which implement interference cancellation, the natural and unavoidable variability in received signal strengths can be exploited by decoding the stronger signals, and cancelling them first. This in fact forms the basis of ordering of decoding for the iterative process in systems which implement interference cancellation. However, the natural variability mentioned above results in only a slight increase in capacity because it is so small and uncontrolled. Furthermore, in pedestrian applications, fading typical of land mobile radio channels becomes very slow, resulting in even less variability than typical land mobile radio channels. In either case, if each of the plurality of signals transmitted by subscribers is at approximately the same power level, the performance of the interference canceller is greatly degraded. It is also necessary to track this natural variability in a continuous fashion in order to know the sequence for subscriber signal decoding.

Therefore, a need exists for a method and apparatus to improve the performance of systems which employ interference cancellation.

DETAILED DESCRIPTION OF A PREFERRED EMBODIMENT

Figure 1:
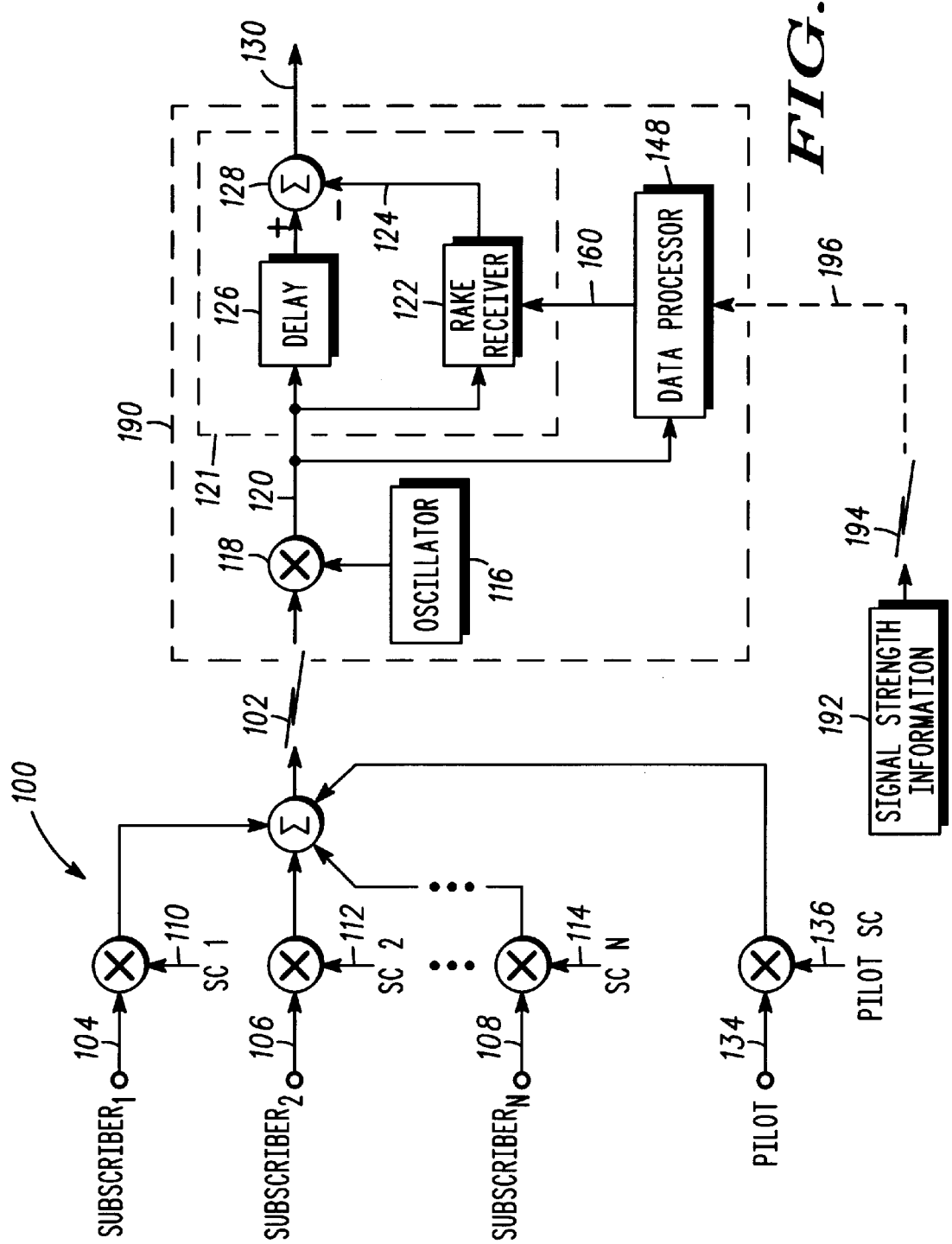
FIG. 1 generally depicts, in block diagram form, a receiver unit which may beneficially implement interference cancellation.

Subscriber power levels are adjusted to enhance interference cancellation in a DS-CDMA communication system. A base-station of the communication system receives signals from a plurality of subscribers and evaluates each signal. Based on the evaluation, particular subscribers are commanded to control their power levels such that different predetermined targets for the particular subscribers are maintained. The predetermined targets include, but are not limited to, received power, frame erasure rate, bit error rate and signal quality. The resulting power levels received at the base-station are substantially different, which is beneficially employed to enhance interference cancellation in the DS-CDMA communication system.

The method of subscriber power level adjustment in a communication system is implemented by receiving signals transmitted from a plurality of subscribers and assessing those received signals. The method then controls the transmitted power for certain subscribers in a manner to achieve different predetermined targets (for different subscribers) based on the assessment. In the preferred embodiment, the communication system is a direct sequence code division multiple access (DS-CDMA) communication system which employs interference cancellation. Also in the preferred embodiment, predetermined targets include received power, frame erasure rate, bit error rate and signal quality.

When assessing signals the system may, in one embodiment, assess the amount of multipath the signals have experienced, and then control those subscribers having signals assessed to have experienced a small amount of multipath to transmit at a power level above the power level of those subscribers having signals assessed to have experienced a large amount of multipath. In an alternate embodiment, the system may estimate the distance (based on a received signal strength indication) of each of the plurality of subscribers to the base-station then controls those subscribers estimated to be closer to the base-station to transmit at a power level above the power level of those subscribers estimated to be further from the base-station. Control is implemented by sending a power control message to the subscriber to instruct the subscriber to increase or decrease its power level.

In U.S. Patent "Method and Apparatus for Cancelling Spread Spectrum Noise" by Stilwell, et. al., U.S. Pat. No. 5,235,612, assigned to the assignee of the present invention, and incorporated herein by reference, a spread spectrum noise canceller is described. In one embodiment of the interference canceller, a technique for decoding a single subscriber's signal using the conventional DS-CDMA despreading operation is provided. By properly decoding a subscriber's signal, it is possible to effectively eliminate this subscriber's signal from a stored replica of the composite received signal. The decoding of a second subscriber's signal with greater accuracy is thereby made possible using the "subsequent" composite received signal (i.e., after interference cancellation) without the contribution of the first subscriber. This process can be applied iteratively to all user signals.

FIG. 1 generally depicts a communication unit 190 employing a receiver unit 121 which may beneficially implement interference cancellation in accordance with the invention. As depicted in FIG. 1, only a single receiver (for receiving only SUBSCRIBER$_1$ 104 out of N subscribers) is depicted for purposes of clarity. Continuing, a composite received signal 102 is comprised of user information (depicted as SUBSCRIBER$_1$, SUBSCRIBER$_2$, . . . SUBSCRIBER$_N$) for N subscribers. Composite received signal 102 is downconverted by oscillator 116 and input into receiver unit 121. The signal is split for input into delay 126 and RAKE receiver 122. For a background on utilizing RAKE receivers in communication systems, reference is made to John G. Proakis, *Digital Communications*, Second Edition, U.S.A., 1989 at pages 728–739. An appropriate cancellation source, which in the preferred embodiment is in the form of analog cancellation signal 124, is then generated as taught by Stilwell. Cancellation source 124 is then summed, via a summing node 128, with stored composite received signal 102 so that any interference contributed by SUBSCRIBER$_1$ is substantially eliminated. Resulting signal 130 represents composite received signal 102 "clean" of any interference contributed by SUBSCRIBER$_1$.

Figure 2:
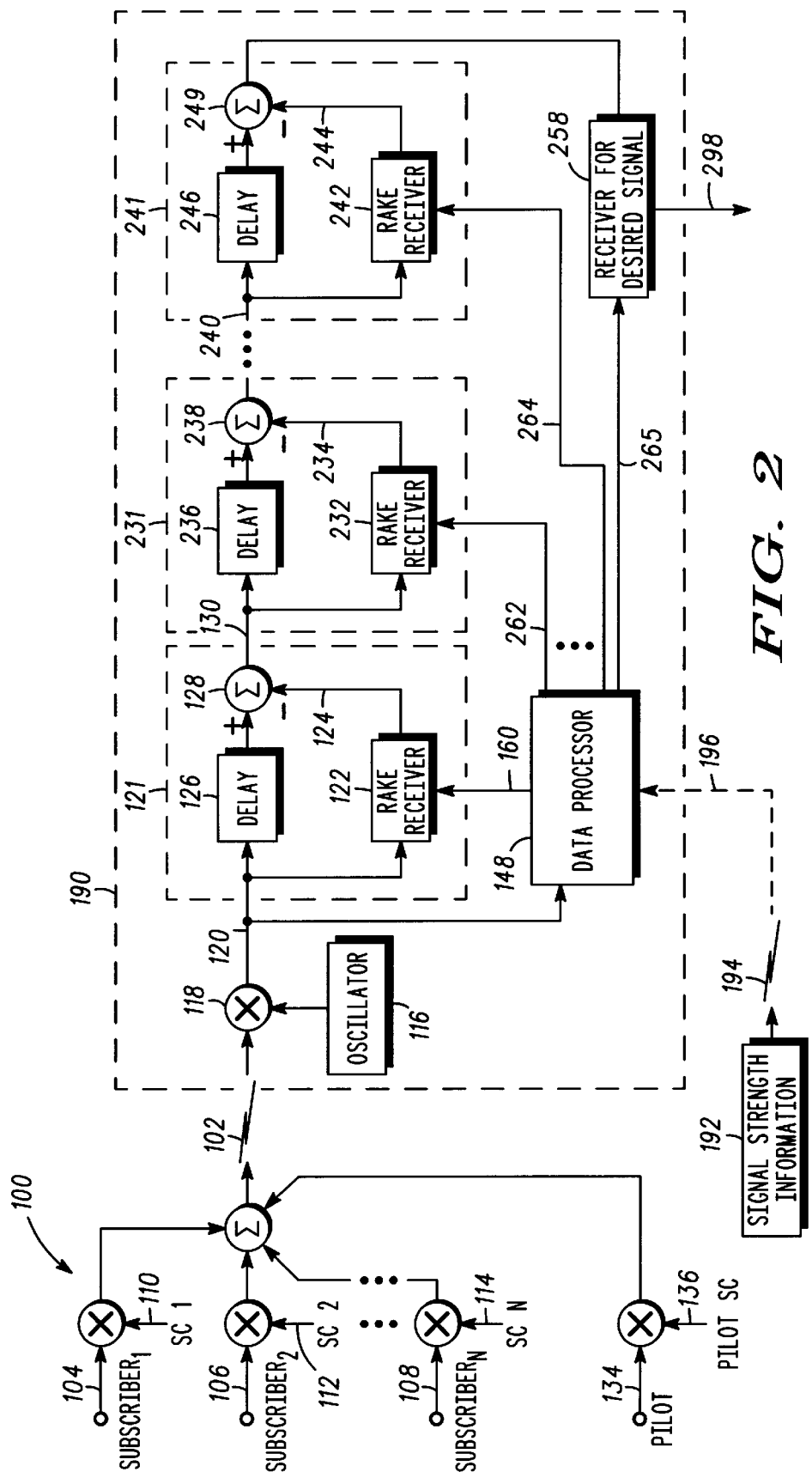
FIG. 2 generally depicts, in block diagram form, a cascade of receiver units which implement interference cancellation.

This technique can be advantageously utilized in a cascade of receiver units. Like elements between FIG. 2 and FIG. 1 have common numbering. FIG. 2 generally depicts a cascade of receiver units 121, 231, 241 which implement interference cancellation in accordance with the invention. The operation of each receiver unit 121, 231, 241 is identical to the description of unit 121 with reference to FIG. 1, except that RAKE receivers 122, 232, 242 are each dedicated to decoding information of particular subscribers SUBSCRIBER$_1$, SUBSCRIBER$_2$, SUBSCRIBER$_N$. As stated previously, resulting signal 130 is input into receiver unit 231 "clean" of any interference contributed by SUBSCRIBER$_1$, and so on.

Figure 3:
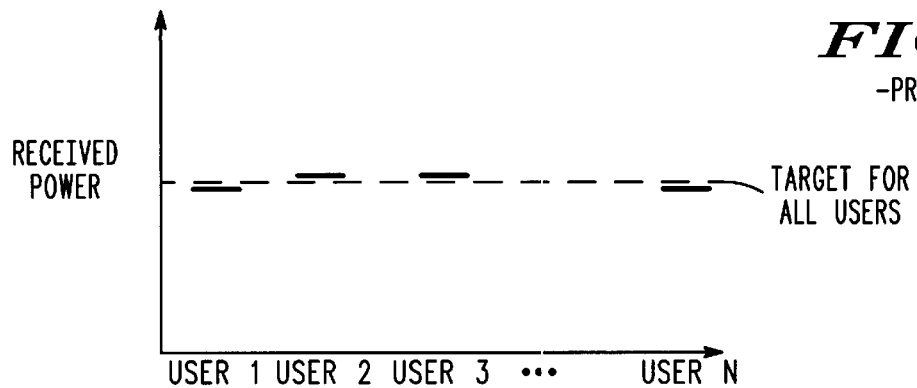
FIG. 3 shows the typical results of the prior art technique for setting subscriber transmitter powers.

Power control in CDMA systems is well known. For example, one prior art technique is described in "*On the System Design Aspects of Code Division Multiple Access (CDMA) Applied to Digital Cellular and Personal Communications Networks*," Allen Salmasi and Klein S. Gilhousen, 41st IEEE Vehicular Technology Conference, May 19–22, 1991, St. Louis, Mo., U.S.A., pages 57–62. FIG. 3 shows a typical plot of the received power for a plurality of subscribers when the prior art technique of power control is utilized. It is noted that the received powers are essentially the same, with some very small variability due to the finite power control setting precision, continuously changing channel characteristics, etc.

With interference cancellation, it is generally possible to provide even higher capacities compared to traditional DS-CDMA. As mentioned above, the performance of interference cancellation techniques at a base-station receiver as that described with reference to FIG. 1 and FIG. 2 rely heavily on the natural variability in received powers for different subscribers.

Figure 4:
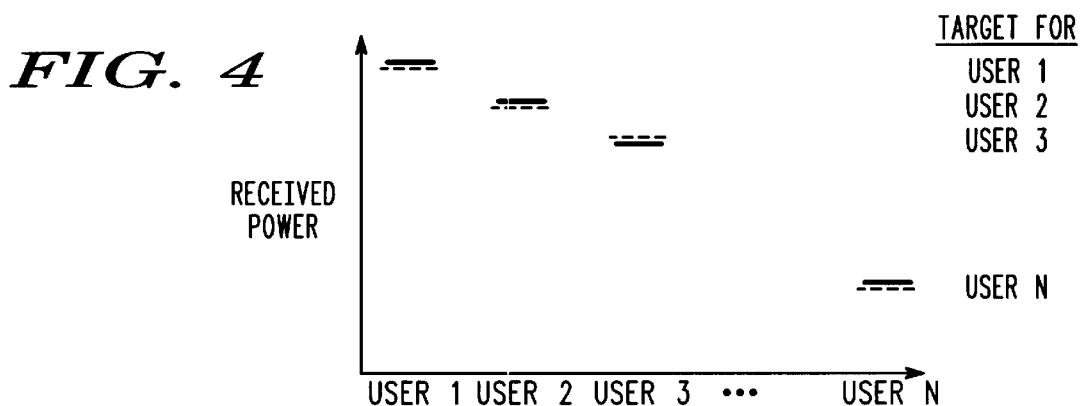
FIG. 4 shows the results of subscriber power level adjustment in accordance with the invention.

As such, power control techniques to ensure that different subscribers are received at different power levels are employed in accordance with the invention. In one aspect of the invention, different received power threshold targets are established for different subscribers. The power control loops then operate to drive the individual subscribers to these different thresholds, which in turn forces a variability in received powers. Such a variability is depicted in FIG. 4 where a plot of the received powers for a plurality of subscribers employing subscriber power level adjustment in accordance with the invention is shown. It is noted that the received power variability is quite pronounced. This variability improves the performance of the interference cancellation scheme (since the strongest signals are easier to decode and "cancel") and also simplifies its use since it is no longer necessary to determine which subscriber's signal is being received the strongest as in the limited variability scenario.

Figure 5:
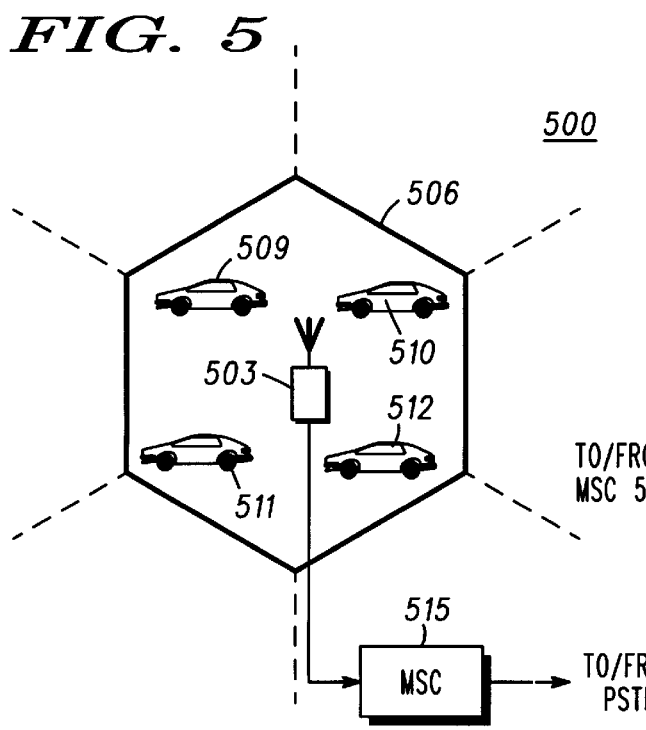
FIG. 5 depicts a communication system which may beneficially employ subscriber power level adjustment in accordance with the invention.
Figure 6:
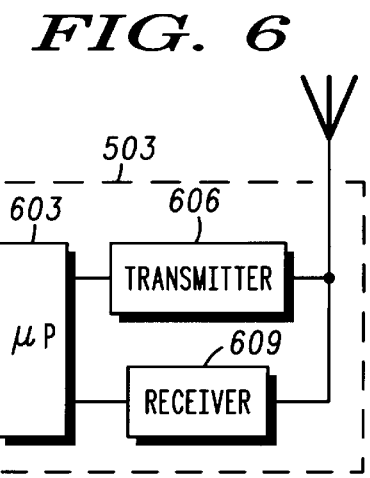
FIG. 6 generally depicts a base-station which may implement subscriber power level adjustment in accordance with the invention.

FIG. 5 depicts a DS-CDMA communication system 500 which may beneficially employ subscriber power level adjustment in accordance with the invention. FIG. 5 depicts base-station 503, in a cell 506, receiving signals from a plurality of subscribers 509–512. Only a single base-station 503 and cell 506 are shown for clarity; in actuality, many base-stations and cells may be utilized to service a particular coverage area. Subscribers 509–512 may transmit the signals USER1–USERN at different received powers (as received by base-station 503) as shown in FIG. 4. Base-station 503 is coupled to a Maintenance and Switching Center (MSC) 515, which is itself coupled to a public switched telephone network (PSTN, not shown). Base-station 503 is generally depicted in FIG. 6, and generally comprises, inter alia, a receiver 609, a transmitter 606, and a microprocessor ($\mu$P) 603 which implements subscriber power level adjustment in accordance with the invention. For further details on a DS-CDMA communication system, see the "*On the System Design Aspects of Code Division Multiple Access (CDMA) Applied to Digital Cellular and Personal Communications Networks,*" paper by Salmasi and Gilhousen cited above.

In another aspect of the invention, optimum assignment of the power control thresholds to particular subscribers to further optimize the system's performance may be employed. For example, received signals that experience excessive multipath will not cancel as effectively as signals that have less associated multipath. Therefore, a strategy that increases the power received from signals experiencing less multipath leads to improved system performance since these signals would be the first to be cancelled and would be cancelled with improved accuracy.

The magnitude of experienced delay spread can be estimated from the RAKE receiver parameters. Alternatively, other criteria might be employed upon which to base the power control threshold assignments. For example, the closer a subscriber is to a base-station, the less likely the signal will be degraded by multipath. Therefore, this subscriber's signal would be preferentially assigned to transmit to a higher power control target. This is a fortuitous assignment in other respects, too. This subscriber is less likely to be an interferer to an adjacent cell since it is more distant. Also, it is more likely that this subscriber has the transmitter power margin to reliably achieve the higher threshold level desired.

As is evident, the base-station can use any of numerous parameters to establish the respective power level target of the various subscriber remotes and will instruct the respective remotes via the downlink power control channel to adjust their respective power levels accordingly. Some of these parameters and criterion include:

1. Subscriber transmit power level,
2. Subscriber receive power level,
3. Subscriber received signal to noise ratio,
4. Physical proximity to base site,
5. A subscriber report on the level it is receiving the pilots of adjacent cells and in particular about being in a hand-off situation,
6. Information from the RAKE receiver about the multipath situation,
7. Desirability to be able to decode a particular user—may be driven by tariff, value of subscriber to operator, etc.

Several criteria can be used separately, or jointly, to decide on the particular order of subscribers to achieve the above power ordering.

It should be noted that received signal strength is not the only criterion that can be used to establish power control threshold criteria. For example, an alternative useful metric is decoded frame erasure rate. In any case, traditional practice is to control the subscriber powers so that the criterion target is the same for all subscribers.)

While the invention has been particularly shown and described with reference to a particular embodiment, it will be understood by those skilled in the art that various changes in form and details may be made therein without departing from the spirit and scope of the invention.

What we claim is:

1. A method of controlling subscriber power level in a base-station of a cellular communication system, the method comprising the steps of:

receiving, in a receiver of the base-station, signals transmitted from a plurality of subscribers to produce received signals;

assessing the received signals based on error rates of the received signals and the quality of signal cancellation within the receiver; and controlling the transmitted power level of the subscribers to achieve different predetermined power threshold targets for certain subscribers based on said step of assessing to enhance the signal cancellation within the receiver.

2. The method of claim 1 wherein the communication system further comprises a direct sequence code division multiple access (DS-CDMA) communication system.

3. The method of claim 1 wherein the step of assessing received signals based on error rates of the received signals further comprises the step of assessing the received signals based on the frame erasure rate of the received signals or the bit error rate of the received signals quality of the received signals.

4. An apparatus for adjusting subscriber power level in a cellular communication system, the apparatus comprising:

means for receiving, at a receiver of a base-station, signals transmitted from a plurality of subscribers to produce received signals; and means for assessing the received signals based on error rates of the received signals and the quality of signal cancellation within the receiver and controlling the transmitted power level of the subscribers to achieve different predetermined power threshold targets for certain subscribers based on the error rates of the received signals to enhance the signal cancellation within the receiver.

5. The apparatus of claim 4, wherein the communication system further comprises a direct sequence code division multiple access (DS-CDMA) communication system.

6. The apparatus of claim 4 wherein the means for assessing the received signals based on error rates of the received signals further comprises means for assessing the received signals based on a frame erasure rate of the received signals and a bit error rate of the received signals.

7. An apparatus for adjusting subscriber power level in a cellular communication system, the apparatus comprising:

a receiver for receiving signals transmitted from a plurality of subscribers to produce received signals; and a microprocessor for assessing the received signals based on error rates of the received signals and for assessing the quality of signal cancellation within the receiver; and a transmitter for instructing certain subscribers to transmit at different predetermined power threshold targets based on the assessment of the received signals to enhance the signal cancellation within the receiver.

8. The apparatus of claim 7 wherein the receiver implements a cascade of receiver units to provide interference cancellation.

9. The apparatus of claim 8 wherein a receiver unit in the cascade of receiver units decodes information for a particular subscriber.

10. The apparatus of claim 9 wherein the receiver unit in the cascade of receiver units is chosen to decode the information for the particular subscriber based on the assessment of the received signals.

11. The apparatus of claim 10 wherein the assessment of the received signals based on error rates of the received signals is based on a frame erasure rate of the received signals or a bit error rate of the received signals.

12. The apparatus of claim 9 wherein the receiver unit in the cascade of receiver units is chosen to decode the information for the particular subscriber based on the subscriber's power threshold target.

13. An apparatus for adjusting subscriber power level in a cellular communication system, the apparatus comprising:

a cascade of RAKE receiver units for receiving, at a base-station, signals transmitted from a plurality of subscribers to produce received signals and for providing interference cancellation; and means for assessing the amount of multipath the received signals have undergone during transmission and controlling the transmitted power level of the subscribers to achieve different predetermined power threshold targets for certain subscribers based on the assessment to enhance the interference cancellation in the cascade of RAKE receiver units.

14. The apparatus of claim 13 wherein said means for controlling further comprises means for controlling those subscribers having signals assessed to have experienced a small amount of multipath to transmit at a power level above the power level of those subscribers having signals assessed to have experienced a large amount of multipath.

15. An apparatus for adjusting subscriber power level in a cellular communication system, the apparatus comprising:

means for receiving, at a base-station, signals transmitted from a plurality of subscribers to produce received signals which are subject to interference cancellation; and means for estimating the distance of each of the plurality of subscribers to the base-station and controlling the transmitted power level of the subscribers to achieve different predetermined power threshold targets for certain subscribers based on the estimation so that interference cancellation in the means for receiving is enhanced.

16. The apparatus of claim 15 wherein said means for controlling further comprises means for controlling those subscribers estimated to be closer to the base-station to transmit at a power level above the power level of those subscribers estimated to be further from the base-station.

* * * * *